(No Model.) 2 Sheets—Sheet 1.

T. M. FLENNIKEN, Dec'd.
W. McGregor, Administrator.
CULTIVATOR.

No. 273,673. Patented Mar. 6, 1883.

ATTEST:
A. O. Behel
C. D. Kress

INVENTOR:
Theodore M. Flenniken
BY Jacob Behel
ATTY.

(No Model.) 2 Sheets—Sheet 2.
T. M. FLENNIKEN, Dec'd.
W. McGREGOR, Administrator.
CULTIVATOR.
No. 273,673. Patented Mar. 6, 1883.
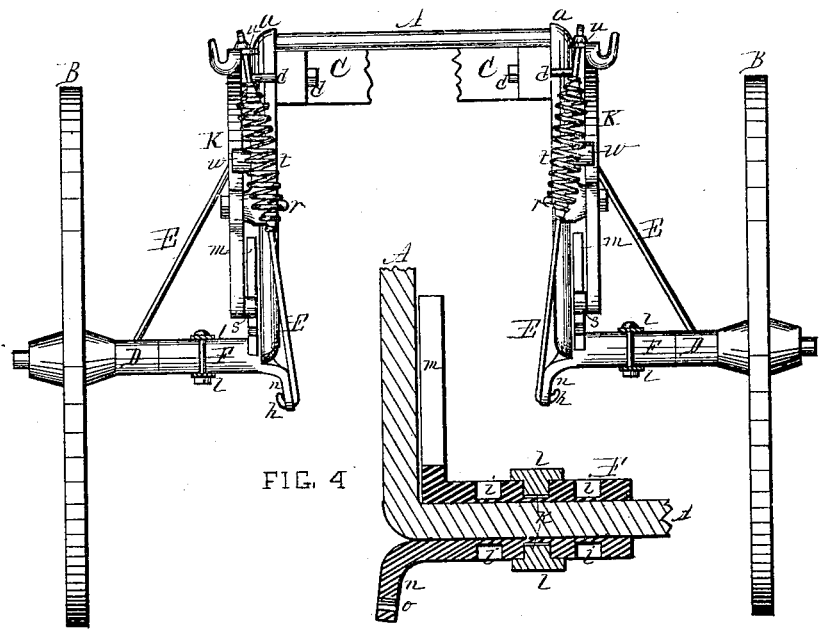
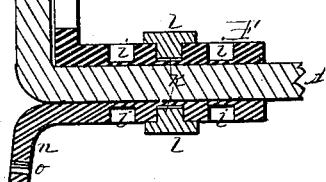
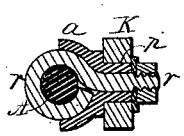
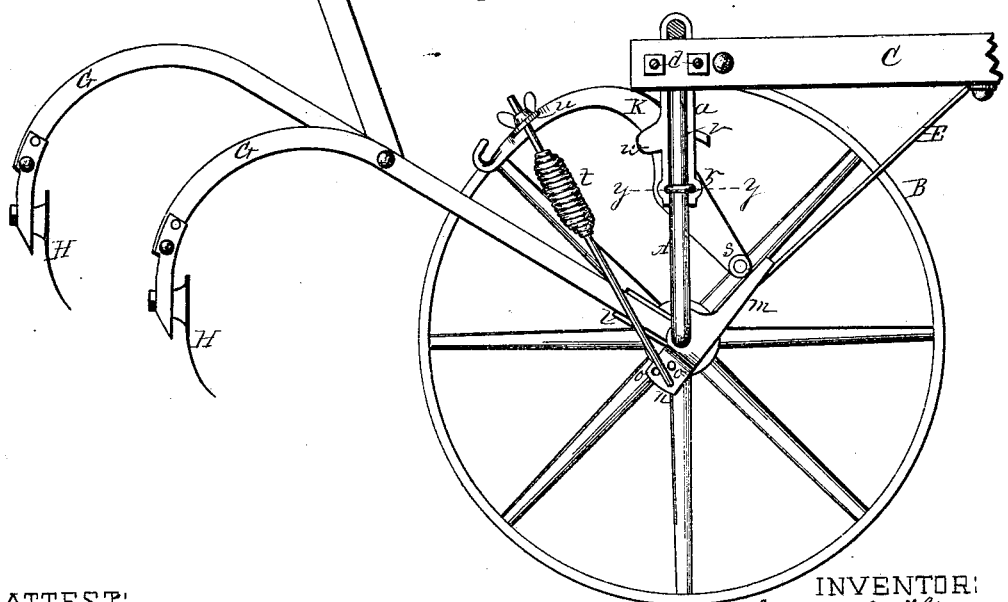
ATTEST:
A. O. Behel
C. O. Kruss
INVENTOR:
Theodore M. Flenniken
BY Jacob Behel
ATTY.

UNITED STATES PATENT OFFICE.

THEODORE M. FLENNIKEN, OF ROCKFORD, ILLINOIS, (WILLIAM McGREGOR ADMINISTRATOR OF SAID FLENNIKEN, DECEASED;) SAID FLENNIKEN ASSIGNOR TO NORMAN C. THOMPSON, OF SAME PLACE.

CULTIVATOR.

SPECIFICATION forming part of Letters Patent No. 273,673, dated March 6, 1883.

Application filed February 27, 1882. (No model.)

*To all whom it may concern:*

Be it known that I, THEODORE M. FLENNIKEN, a citizen of the United States, residing in the city of Rockford, in the county of Winnebago and State of Illinois, have invented new and useful Improvements in Cultivators, of which the following is a specification.

This invention relates to that class of cultivators known as "straddle-row walking" cultivators.

The object of this invention is to produce a cultivator capable of being handled with greater ease and certainty, to enable the operator to produce better results; and it consists in mechanism capable of adjustment to cause the cultivator-teeth to engage the ground with greater or less force; in mechanism to assist in elevating the shovel-beams; in mechanism to hold the shovel-beams elevated in turning and getting into position to employ the cultivator, and from which position they may be lowered to their working position by a downward pull on the handles, and in mechanism to suspend the shovel-beams for the purposes of transportation. These and other features, including the necessary devices and their several combinations, all of which will be hereinafter more fully described, constitute the subject-matter of this specification.

Figure 1:
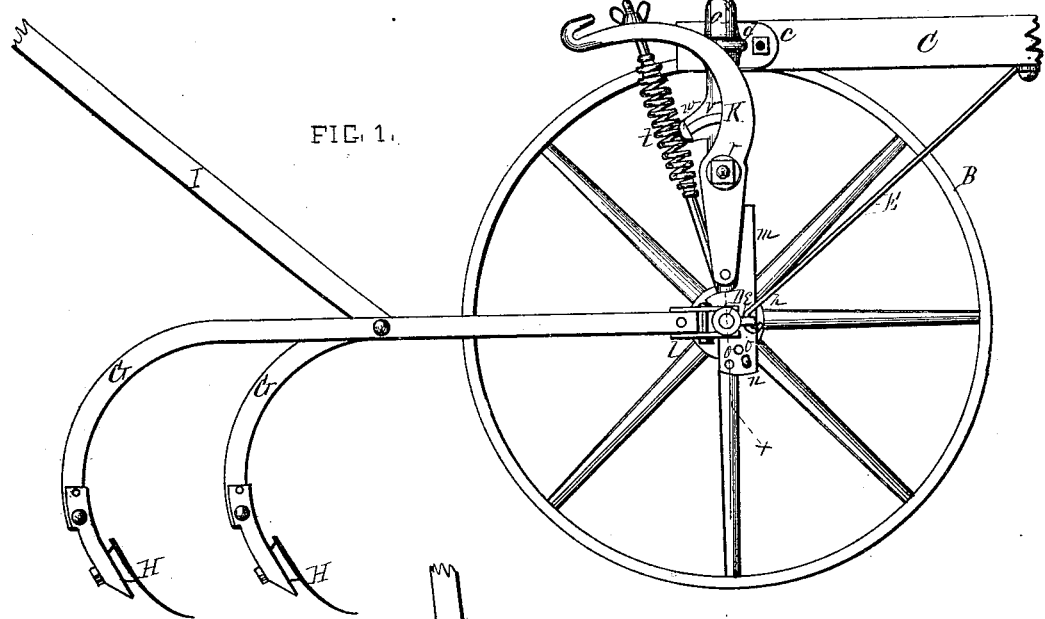
Figure 2:
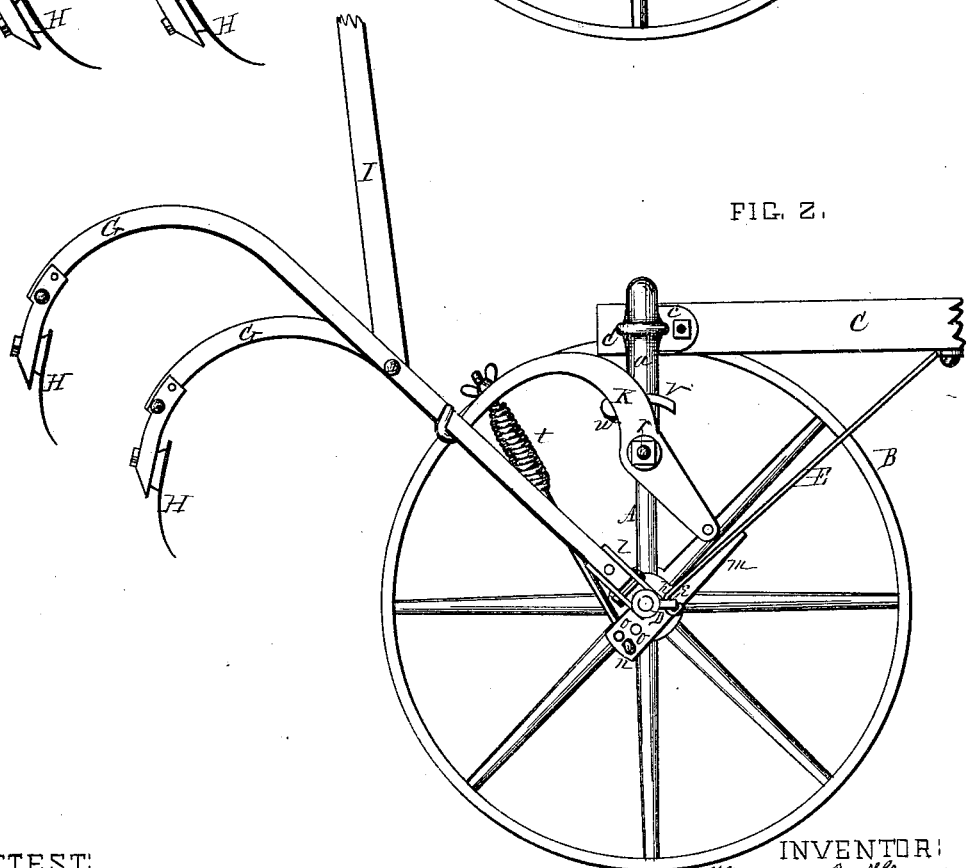

In the accompanying drawings, Figure 1 is a side elevation of a cultivator embodying my invention, and in which the outer carrying-wheel is omitted, and the shovel-beams are represented in their working position. Fig. 2 is also a side elevation with outer carrying-wheel omitted, and in which the shovel-beams are represented in position for transportation. Fig. 3 is a rear elevation in which the shovel-beams are omitted. Fig. 4 is a central vertical section of a portion of bent axle-tree and shovel-beam connection on dotted line *x*. Fig. 5 is a transverse section on dotted line *y*, and Fig. 6 is an inside elevation of one side of the cultivator with shovel-beams suspended in their elevated position for turning and getting into position to employ the cultivator.

In the figures, A represents a bent or crank-formed axle-tree, having its axle-arm portions fitted to receive carrying-wheels to revolve thereon.

At B are represented carrying-wheels, mounted to revolve on the axle-arms of the bent axle-tree.

At C are represented tongue-beams, having their rear end portions fixed to the vertical arms of the axle-tree in the inner angle formed by the vertical arms and central horizontal portion thereof. These beams, from their connection with the axle-tree, extend forward, inclining toward each other, and meet at a proper distance in front of the axle-tree; and their meeting ends are fitted to receive the neck-yoke to connect with the harness of the team. These parts are substantially the same as like parts of similar machines now in use, and to be found in the trade.

At *a* is represented a metallic semi-sleeve, semicircular in cross-section, and of suitable dimensions and conformation to receive the outside and upper curving end portion of the vertical arms of the bent axle-tree. These sleeves, near their upper ends, are provided with an ear, *c*, projecting in the lengthwise direction of the tongue-beams, and are perforated to receive the screw-threaded arms of the staple-bolts *d*, which extend through the tongue-beams, and by means of screw-nuts serve to fix the parts firmly together. The sleeves, at the point which receives the loop or bow portion of the screw-staples, are formed with a groove, producing a seat to receive them. The ears *c* of the sleeves are provided with an additional hole to receive an additional bolt to connect it with the tongue-beams to give additional firmness and strength to the parts.

At D are represented tubular collars fitted to receive the outer portion of the axle-tree, immediately inside of the carrying-wheels. These collars are provided with perforated ears *e*, projecting from their forward side, and receive the lower hook end, *h*, of the brace-rods E. These brace-rods E extend from their connection with the ears *e* to meet the tongue-beams forward of the axle-tree, at which point they are fixed to the beams by suitable screw-bolts.

At F are represented sleeves placed upon the lower horizontal portion of the axle-tree, between the vertical arms thereof and the tubular collars D. These sleeves F are provided with a series of holes, *i*, on their upper and under sides, fitted to receive studs *k* of joint-plates *l*, employed to connect the forward end of the shovel-beams with the axle-tree in such a manner that their rear ends will be free to move in a vertical or lateral plane, but rigid to prevent axial or rolling movement of the beams, and by means of the series of holes in the sleeves the beams may be placed closer to or farther from each other.

At G are represented shovel-beams, which in this instance are produced from bar material, having their rear ends curved downward.

At H are represented shovels or cultivator-teeth, suitably connected to the downturned rear ends of the beams by safety attachments, and are made vertically adjustable, and capable of being turned with their face oblique to the line of travel to throw the earth to either side.

At I are represented handles fixed to the beams, by means of which the operator can control the movements of the cultivator-shovels. The inner ends of the sleeves F are provided with an uprising lateral arm, *m*, which rises on the outside of the vertical arms of the axle-tree, and are also provided with an arm, *n*, depending from its extreme inner end, and these depending arms are provided with a series of holes, *o*, variously distributed, the purpose of which, in connection with the depending arm *n* and the lateral arm *m*, will be hereinafter described. The semi-sleeves *a* are provided near their lower ends with a tubular stud, *p*, projecting laterally outward, and at this point the sleeves are enlarged and adapted to receive a screw-eyebolt, *r*, fitted to receive the vertical arm of the axle-tree, and its screw-threaded arm extends outward through the tubular stud, having its projecting screw-threaded end provided with a washer and with a screw-nut, by means of which the parts are securely clamped and held in position.

At K are represented curved levers of the form shown, one of which is employed on each side of the machine, having their fulcrum-support on the tubular stud *p* of the semi-sleeve *a*. The lower ends of the depending arms of these curved levers are fitted with a traveling roller, *s*, in position to engage the rear side of the lateral arm *m*, and their upper arms are curved rearward, having their extreme rear ends produced in hook form, adapted to receive the shovel-beams, when elevated, to hold them suspended for the purpose of transportation.

At *t* is represented a spring having a rod or bar extension at each end. The end of one of these extensions is produced in hook form, adapted to enter the holes *o* in the depending arm *n* of the sleeves F in such a manner as to be readily changed to any of the holes in the depending arm. The upper extension rods or bars of the spring *t* are screw-threaded, and extend upward through an ear, *u*, projecting from the upper portion of the curved levers K, and their screw-threaded ends are provided with a thumb-nut, by means of which the tension of the spring may be varied to give the required force to support the shovel-beams properly. The metallic semi-sleeves *a* are provided with a curved transverse bar, *v*, extending forward and rearward thereof, and serves as a guide to the movements of the curved lever. The rear extensions of these bars are formed with an outward projection, *w*, which serves to limit the rearward movements of the levers. In this instance the holes *o* in the depending arm *n* of the sleeve F are arranged in such a manner that when the spring is connected in the forward lower hole and the shovel-beams are in their working position, as at Fig. 1, the line of spring action will be forward of the axial center, on which the beams vibrate vertically, and in such relation to the point of contact of the traveler with the lateral arm of the sleeve to which the shovel-beams are connected that the spring action will operate to hold the shovels to the ground at their working depth with greater force and firmness, and cause them to run at a uniform depth, and when the ground is very hard this feature is of great value. When the spring is connected to the depending arm in the rear lower hole and the shovel-beams are in their working position, as at Fig. 1, the line of spring action will be rearward of the axial center on which the beams vibrate vertically, and in such relation to the point of contact of the traveler with the lateral arm of the sleeve to which the shovel-beams are connected that the spring action will operate to counteract the downward tendency of the shovel-beams and cause them to adhere to the ground with less force. This feature, when the ground is light, is found to be valuable, and greatly relieves the operator. If the spring is connected in the center or upper hole in the depending arm and the shovel-beams are in their working position, the spring action will be slightly forward of the axial center on which the beams vibrate vertically, and in such relation to the point of contact of the traveler with the lateral arm of the sleeve to which the shovel-beams are connected that these two forces will be substantially in equilibrium, and will not materially change the working action of the cultivators. It will be seen, however, that in any of the positions of the spring, in connection with the depending arm hereinbefore described, when the shovel-beams are raised the action of the spring will cause the traveler in the lower end of the curved lever to ascend the lateral arm until the lever engages the outward-projecting stop *w* on the curved guide-bar *v*, when the relative position of its lower arm with the lateral arm, in connection with the spring action, will be such as to hold the beams suspended, as represented in Fig. 6, to lessen the labor in handling, as in turning at the ends of the rows, or in getting the machine in position to be employed in cultivation, and when in position the beams can be lowered to their working position by a downward pull on the handles. When the hook end of the lower spring-bar is connected to the depending arm, in either of the holes therein, the holding force of the spring can be varied by means of the thumb-screw on its upper end, to hold the beams suspended in the same position as shown in Fig. 6, and to be lowered therefrom in the same manner.

For the purpose of transportation the shovel-beams are raised to engage the hook on the rear end of the lever, as represented in Fig. 2. It will readily be seen that the spring, in its connection with the depending arm of the sleeve to which the shovel-beams are pivoted and its position relatively with the several parts with which it coacts, may be varied to any practical extent and still be within the scope of my invention. I have also described the guide to the movements of the curved lever as consisting in a curved bar fixed to the semi-sleeve, and the stop to limit its rearward movements as a projection on its rear end; but evidently these parts may be independent, and are capable of various constructions to accomplish the same results without departing from the gist of this part of my invention.

In the foregoing I have omitted some parts necessary to produce a complete machine; but such omitted parts may be supplied by the employment of any of the known or usual parts capable of use in connection with my improved machine.

I claim as my invention—

1. The combination, with the sleeve to which the shovel-beams are pivoted, provided at its inner end with an uprising lateral arm, of a lever pivoted to the main frame or axle and adapted to engage the uprising lateral arm, but disconnected therefrom, substantially as and for the purpose set forth.

2. The sleeve to which the shovel-beams are pivoted, provided with an uprising arm and a depending arm, and a pivoted lever, one end of which is adapted to engage the lateral arm, but disconnected therefrom, in combination with the spring connected to the free end of the pivoted lever and with the depending arm of the sleeve, substantially as and for the purpose set forth.

3. A spring, substantially as herein described, having an adjustable connection with the depending arm of the sleeve to which the shovel-beams are pivoted, and a suitable connection with the free arm of the lever which engages the lateral uprising arm of the sleeve, for the purpose of varying its action on the shovel-beams, substantially as hereinbefore set forth.

4. A spring, substantially as herein described, having a suitable connection with the depending arm of the sleeve to which the shovel-beams are pivoted, and an adjustable connection with the free arm of the lever which engages the lateral uprising arm of the sleeve for the purpose of varying its spring force, substantially as and for the purpose hereinbefore set forth.

5. The combination, with the pivoted lever having a depending arm for engaging the uprising lateral arm of the sleeve to which the shovel-beams are connected, of a guideway, $v$, for engaging the free arm of said lever for directing the vibratory movement of the same, substantially as and for the purpose hereinbefore set forth.

6. The pivoted lever having a depending arm for engaging the uprising lateral arm of the sleeve, in combination with a stop for limiting the throw of said lever, substantially as and for the purpose set forth.

7. The combination, with the pivoted lever for automatically controlling the movements of the shovel-beams, of a guide bar or way to direct the movements of said lever, and a stop to limit its rearward movement, substantially as described.

8. The combination, with the sleeve to which the shovel-beams are pivoted, provided with an uprising lateral arm, of a pivoted lever, one end of which is adapted to engage the lateral arm of the sleeve, and having a free hooked end to engage the shovel-beams, substantially as and for the purpose set forth.

THEODORE M. FLENNIKEN.

Witnesses:
C. C. HILL,
A. O. BEHEL.